T. O. WILLIAMS.
PULVERIZER.
APPLICATION FILED JULY 24, 1909.
946,416.
Patented Jan. 11, 1910.
4 SHEETS—SHEET 1.
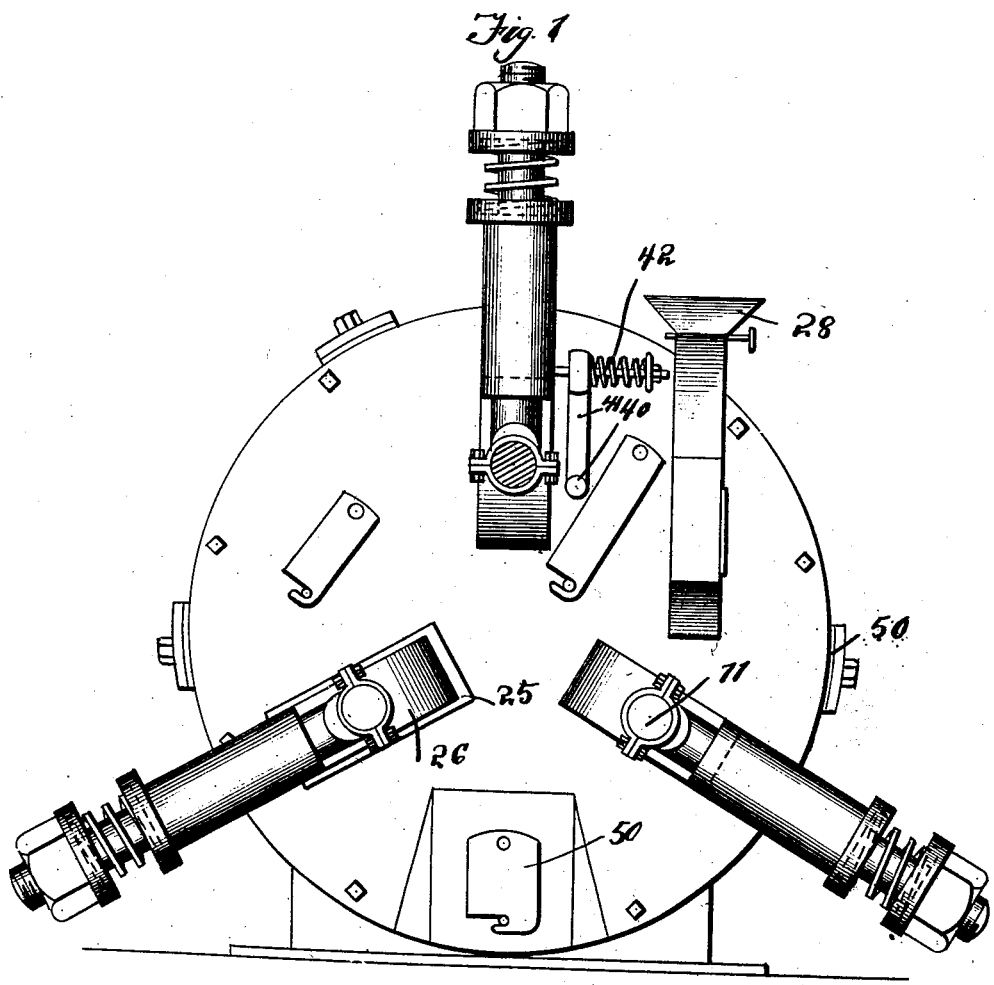
Inventor
Thomas O. Williams
By Victor J. Evans
Attorney
Witnesses

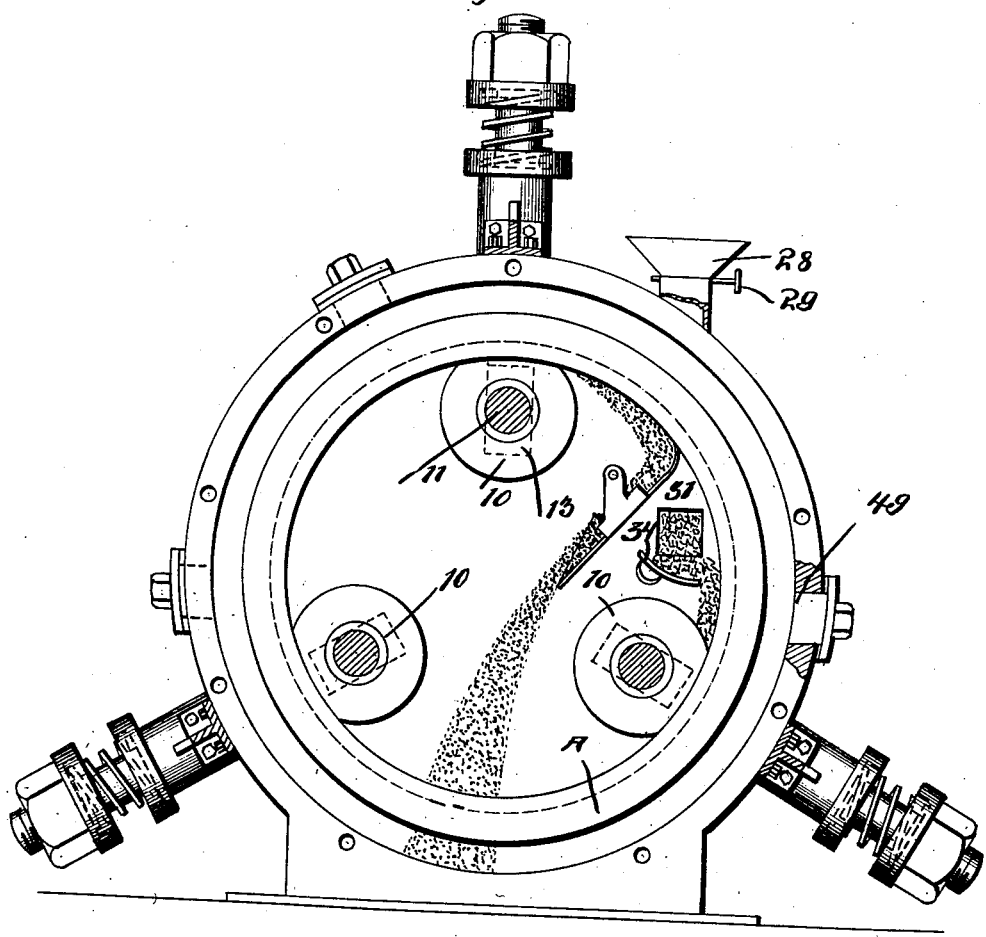

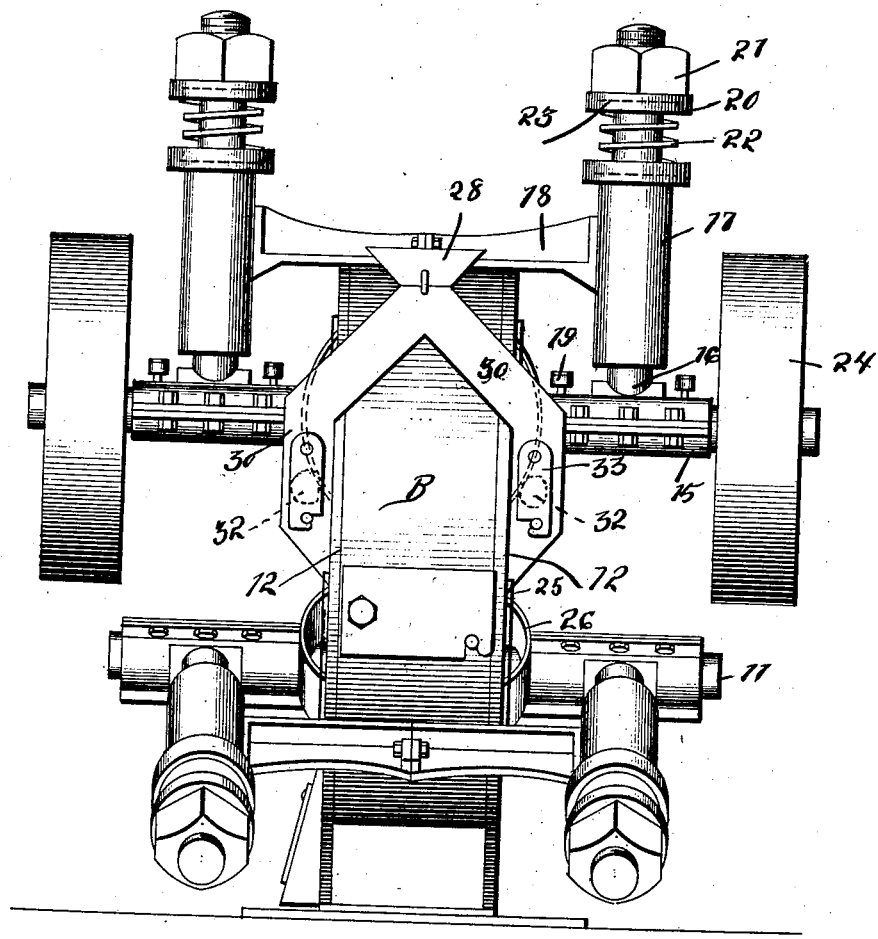

T. O. WILLIAMS.
PULVERIZER.
APPLICATION FILED JULY 24, 1909.
946,416.
Patented Jan. 11, 1910.
4 SHEETS—SHEET 4.
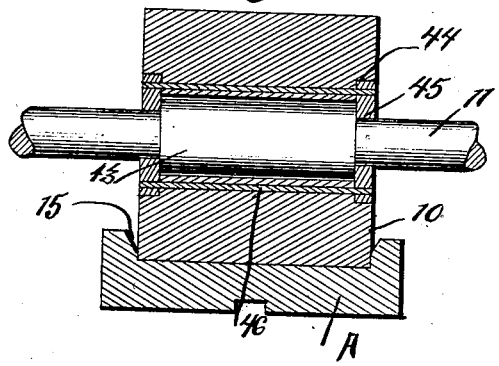
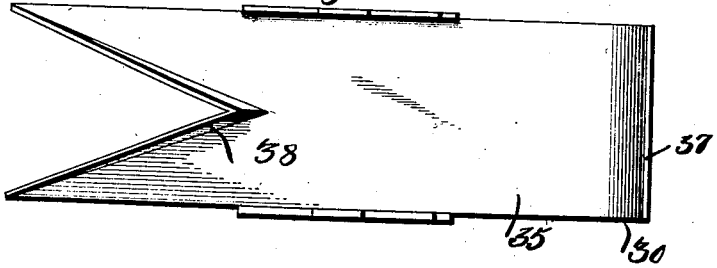
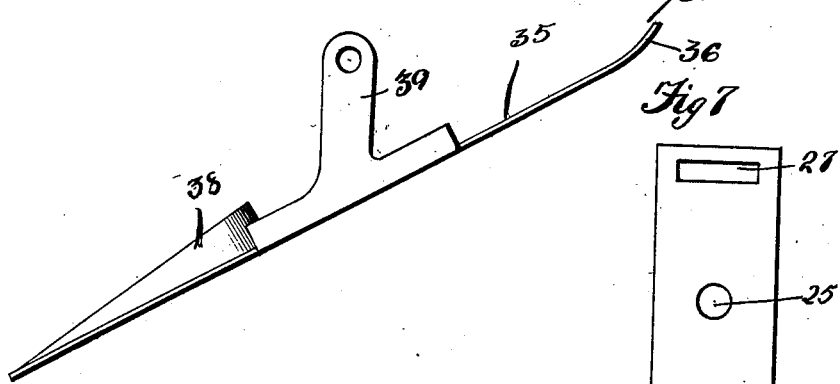
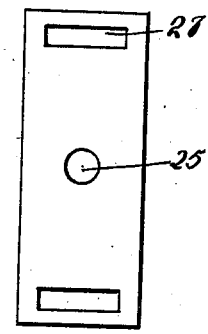
Witnesses
Inventor
Thomas O. Williams
By Victor J. Evans
Attorney

UNITED STATES PATENT OFFICE.

THOMAS O. WILLIAMS, OF DIXON, ILLINOIS.

PULVERIZER.

946,416.

Specification of Letters Patent. Patented Jan. 11, 1910.

Application filed July 24, 1909. Serial No. 509,257.

*To all whom it may concern:*

Be it known that I, THOMAS O. WILLIAMS, a citizen of the United States, residing at Dixon, in the county of Lee and State of Illinois, have invented new and useful Improvements in Pulverizers, of which the following is a specification.

This invention relates to that class of pulverizing machines in which a crushing ring is supported upon a plurality of crushing rolls, the shafts of the latter being radially movable with reference to the crushing ring and to the casing in which the mechanism is inclosed, and said roll carrying shafts being flexibly supported by means of springs, thus making the crushing ring and the rolls relatively yielding.

The present invention has for its object to simplify and improve the construction and operation of this class of machines; and with these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being however, understood that no limitation is necessarily made to the precise structural details therein exhibited, but that changes, alterations and modifications within the scope of the invention may be resorted to when desired.

In the drawings: Figure 1 is a side view of a pulverizing machine constructed in accordance with the invention. Fig. 2 is a side elevation partly in section showing the machine with the near end plate or cover of the casing removed. Fig. 3 is an end view. Fig. 4 is a sectional detail view showing one of the crushing rolls, a portion of the shaft of the same and showing also a cross sectional view of the crushing ring. Fig. 5 is a detail plan view of the scraper, for removing the pulverized material. Fig. 6 is a side view of the scraper. Fig. 7 is a detail view of one of the dust guards.

Corresponding parts in the several views are denoted by like characters of reference.

The crushing ring A is supported upon a plurality of rolls 10—10, the shafts of which, 11, project through the heads or ends 12 of the casing B; the ends of the casing being provided with radially disposed slots 13. The roll carrying shafts are forced outwardly by the action of suitably disposed springs as will be hereinafter more fully described so that the crushing ring will be supported entirely upon the rolls and in direct contact with each of the latter. The crushing ring is provided at its edges with flanges 14, beveled upon their inner faces as shown at 15 in Fig. 4, and lateral displacement of the ring will thus be prevented.

The bearings 15 in which the projecting ends of the roll carrying shafts 11 are supported for rotation are provided with radially extending arms 16 that are slidable in sockets 17 supported upon the ends of cross bars 18 that are securely mounted upon the casing, exteriorly of the latter. Oil cups or lubricating devices 19 have been shown upon the shaft bearings 15. The arms 16 are provided with washers 20 and with adjusting nuts 21 for the purpose of regulating the stress or tension of springs 22 which are coiled upon the arms 16 between the outer ends of the sockets 17 and the inner faces of the washers 20, and the said washers as well as the outer ends of the sockets are preferably provided with recesses indicated in dotted lines at 23 in Fig. 3 of the drawing, said recesses affording seats for the ends of the springs to prevent the latter from spreading. The springs 22 should be of great strength and resisting power, and the tension of the springs may be regulated, as stated, by means of the adjusting nuts 21. It will be seen that by this construction and arrangement of parts the several rolls will be forced radially in an outward direction by the action of the springs, thus supporting the crushing ring in such a manner that non-friable material such as pieces of iron and the like may pass between the crushing surface of the ring and the rolls without injury to either. One of the rolls may be driven from any convenient source of power, and the shaft of said roll, for this purpose, being shown provided with pulleys or band wheels 24.

The shafts 11 of the several rolls are provided with dust guards consisting of plates 25 disposed adjacent to the outer sides of the ends of the casing for the purpose of covering the slots 13; and said plates or dust guards are retained in position by means of suitably disposed springs 26 consisting of arched resilient plates mounted upon the shafts, abutting upon the inner ends of the bearings 15 and having their terminal ends fitted in recesses 27 adjacent to the ends of the plates 25 constituting dust guards. The latter as well as the springs 26 obviously move radially in unison with the shafts, and said plates or dust guards will therefore be made sufficiently long to cover the slots or openings 13 under all conditions that are liable to obtain.

The material that is to be crushed is supplied to the machine through a chute or hopper 28 which is equipped with a feed gate or valve operable by means of a handle 29. From the chute or hopper 28 divergent limbs or feed trunks 30 extend adjacent to the ends of the casing each of which is provided with a feed opening 31 that is conveniently accessible through hand holes 32 in the limbs 30 which are normally covered by doors or slides 33. Through the apertures 31 the coarse material that is to be pulverized drops upon a deflector 34 which is supported within the crushing ring and casing, transversely of the latter. Over the deflector 34 the material passes to the inner surface or crushing face of the ring A upon which it will be retained by the action of centrifugal force when the machine is in operation.

For the purpose of removing the crushed or pulverized material from the machine, I avail myself of a scraper consisting of a plate 35 having one end slightly curved or upturned as shown at 36 to present a scraping edge 37; the opposite end of the plate 35 is provided with a V-shaped deflector 38 whereby the material passing through the plate will be deflected laterally to both sides. The side edges of the plate 35 are provided with hangers 39 which in operation are mounted upon a rock shaft 40 suitably supported for oscillation transversely of the casing and projecting through one end of said casing. The projecting end of the rock shaft is provided with an arm or crank 41 which is pressed by a suitably arranged spring 42, the tension of which is exerted to so oscillate the rock shaft that the edge 37 of the scraper will be held resiliently in engagement with the crushing surface of the ring A. Suitable means may be provided for the purpose of regulating the tension of the spring 42; and it will be seen that by this mechanism the scraper will be held in engagement with the crushing ring at all times and under all conditions when the machine is in operation.

The shafts 11 supporting the crushing rolls 10 are preferably provided, intermediate the ends of the rolls, with swelled portions 43, and the ends of the rolls are provided with recesses 44 forming seats for washers 45 which may be secured by means of rods 46 extending longitudinally through the rolls, thus retaining the rolls securely upon the shafts. This construction has been illustrated in Fig. 4 of the drawings.

The casing of the machine has been shown provided with suitable hand holes 49 arranged in various locations to afford convenient access to the interior, said hand holes being normally covered by doors or slides 50 of suitable construction.

From the foregoing description taken in connection with the drawings hereto annexed, the operation and advantages of this invention will be readily understood by those skilled in the art to which it appertains. The material which is fed into the machine through the hopper 28 will be conveyed over the deflector 34 onto the crushing ring, the side flanges of which prevent lateral displacement of the machine. The crushing ring will be revolved by frictional contact with the driving roll, and at a speed sufficiently high to cause the material fed into the machine to remain in engagement with the crushing face of the ring by the action of centrifugal force. The material will be carried by the ring past the several rolls between the faces of which and that of the ring it will be crushed or reduced to the desired degree of fineness which may be regulated by the tension of the springs whereby the roll carying shafts are forced radially outward. After being subjected to the action of the several rolls, the material is removed from the crushing face of the ring by the action of the scraper 35, which latter is supported in an inclined position so that the material will drop by gravity over said scraper, the deflector 38 of which will deflect the material in the direction of the ends of the casing between which and the ends of the crushing ring, the two streams of crushed or pulverized material will be permitted to drop and to finally escape through the bottom of the casing.

This improved pulverizing machine is simple in construction, durable and it will be found to be thoroughly effective for the purposes for which it is provided.

Having thus described the invention what is claimed is—

In a pulverizer of the character described, a crushing ring supported upon a plurality of rolls, resilient supporting means for the shafts of the rolls whereby inward displacement of said rolls will be resisted, an inclined scraper supported within the crushing ring with one edge in resilient engagement with the crushing face of the ring, and a V-shaped deflector upon the scraper whereby the pulverized material will be deflected laterally in two directions over the edges of the ring.

In testimony whereof I affix my signature in presence of two witnesses.

THOMAS O. WILLIAMS.

Witnesses:
 F. BUCKLEY,
 W. G. WILLIAMS.